US005260506A

United States Patent [19]

Cappella

[11] Patent Number: 5,260,506

[45] Date of Patent: Nov. 9, 1993

[54] DRUMSTICK HAVING RIGID RING AROUND TIP

[76] Inventor: Carmen J. Cappella, 21 Point of Woods Dr., North Brunswick, N.J. 08902

[21] Appl. No.: 892,198

[22] Filed: Jun. 2, 1992

[51] Int. Cl.[5] ..... G01D 13/02

[52] U.S. Cl. ..... 84/422.4

[58] Field of Search ..... 84/422.4

[56] References Cited

U.S. PATENT DOCUMENTS 2,853,912 9/1958 Gladstone ..... 84/422.4
3,217,581 11/1965 Hinger ..... 84/422.4
3,998,123 12/1976 Hinger ..... 84/422.4
5,179,237 1/1993 Grossman ..... 84/422.4

*Primary Examiner*—Michael L. Gellner
*Assistant Examiner*—Cassandra C. Spyrou
*Attorney, Agent, or Firm*—Joel F. Spivak

[57] ABSTRACT

A drumstick, such as a conventional solid wooden drumstick has a plastic conformal cap affixed over the striking tip of the drumstick. The cap is provided with a shallow circumferential groove and a metallic ring is affixed within the groove, the surface of the ring extending above the surface of the cap so that the ring impacts the percussion instrument used with the drumstick.

13 Claims, 1 Drawing Sheet

DRUMSTICK HAVING RIGID RING AROUND TIP

FIELD OF THE INVENTION

This invention relates generally to a drumstick, but more particularly to an improved drumstick having a tone enhancing ring around the striking tip of the drumstick.

DESCRIPTION OF THE PRIOR ART

It is well known in the art that various problems and difficulties are encountered in providing a drumstick that is capable of withstanding the severe abuse under the playing techniques demanded by present-day percussionists while still delivering a high quality sound, especially when used on cymbals.

The conventional solid wooden drumstick ranges from about 15" to 18" in length and includes a cylindrical shaft, a tapered neck and an ovalar or spherical tip portion. Such a drumstick has long been the most widely used type of drumstick. The popularity of the wooden drumstick is based upon its optimal mix of characteristics with respect to sound reproduction, weight, distribution of weight, durability, flexibility, resilience, shock absorbability and overall "feel". Conventional wooden drumsticks suffer nonetheless from certain inherent disadvantages, chief among them being chipping, splintering, cracking and somewhat less than desirable tonal quality when used with cymbals.

The prior art is replete with examples of other and non-conventional drumsticks in an attempt to avoid one or more of the disadvantages of conventional solid wooden drumsticks. For example, U.S. Pat. Nos. 4,300,438 and 4,305,544 disclose drumsticks made of impregnated woven fabric; U.S. Pat. No. 3,722,350 discloses the use of a metallic drumstick having a hollowed out shaft while U.S. Pat. No. 4,202,241 employs plastic as the primary drumstick material. Others have employed composites as the primary material.

All of the prior art drumsticks, however, share the common goal of optimizing, through tradeoffs, the properties of tonal reproduction, weight, weight distribution, durability, flexibility, resilience, shock absorbability and overall feel generally found in conventional wooden drumsticks.

I have now developed a drumstick which not only has improved durability, resilience and shock absorbability as well as improved tonal quality especially with respect to use with cymbals but retains the overall feel of the drumstick.

SUMMARY OF THE INVENTION

The drumstick of the present invention comprises a shaft portion and a tip portion for striking the drum or cymbal wherein the tip portion is provided with a hard, preferably metallic, ring circumferentially affixed around the periphery of the tip such that the outer surface of the ring is somewhat raised with respect to the surface of the remainder of the tip so that the ring impacts the drum or cymbal when the drumstick is in use.

In the preferred embodiment of the invention, the drumstick is provided with a plastic cap which is affixed over the tip of the drumstick and the ring is affixed circumferentially to the plastic cap. When used with a wooden drumstick, improved durability, resilience, shock absorbability and tonal quality can be achieved without adversely affecting weight, balance or overall feel of the instrument.

DETAILED DESCRIPTION OF THE INVENTION

It should be understood that while the present invention is described in terms of conventionally shaped solid wooden drumsticks, the novel feature of the invention is applicable to essentially any type of drumstick regardless of material, shape, whether solid or hollow, or other deviation from the conventional drumstick.

Figure 1:
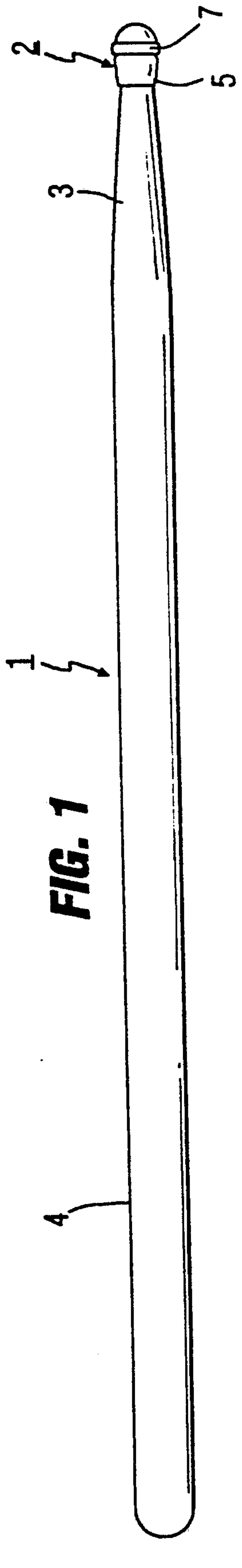
FIG. 1 is a side elevational view of a drumstick in accordance with the present invention.

Referring to FIG. 1, there is shown a solid wooden drumstick 1 of conventional size and shape having a spherical or ovular bulbous striking tip 2 from which there extends rearwardly a tapered neck portion 3 and thence a cylindrical shaft or handle portion 4.

In accordance with the present invention, the striking tip 2 is provided with with a plastic cap 5 affixed thereover. The plastic cap 5 is preferably force fit, molded, cemented or otherwise affixed to the tip 2 so that it does not move or rotate. Preferred plastics for the cap material are those which are not brittle and possess good impact resistance, resilience and shock absorbability and can be adhered to the underlying drumstick tip 2. Examples of useful materials are nylon, polyethylene, polypropylene and the hard rubbers such as the butadienes. Nylon is the preferred material.

The plastic cap 5, as shown, is provided with a shallow groove 6 circumferentially around the periphery thereof. A metal ring 7 is provided within the groove 6, preferably in a manner so that it does not move or rotate therein. The outer surface of the metal ring 7 is somewhat raised from the surface of the cap 5 such that upon impact of the drumstick 1 with a drum or cymbal, the metal ring 7 will impact before the remainder of the striking tip 2. While essentially any metal or alloy is suitable for use as the ring, it is preferred to utilize rust resistant materials such as brass, copper, nickel, chromium or stainless steel. Brass has been found to provide excellent tonal qualities especially when the drumstick is used with cymbals and does not cause damage to the cymbals.

By providing the tip assembly, including the cap and ring, on a conventional wooden drumstick, the problems of chipping, splintering and cracking of the drumstick are greatly diminished while enhancing other attributes of the drumstick.

One method of assembling the novel drumstick when the cap is made of a plastic such as nylon and the ring is a metallic alloy such as brass is to heat the cap with moist heat, and while hot, press fit the metal ring onto the cap so that it lies in the circumferential groove of the cap. An appropriate glue or cement is then applied to the inner surface of the cap and/or the tip of the drumstick and the tip of the drumstick is press fit into the cap. The glue is then allowed to dry. Other techniques are also possible as well as will be apparent to those skilled in the art. For example, the cap material may be formed or molded directly onto the drumstick tip and the ring applied thereafter by first heating the ring to expand it and then pressing the expanded ring into place over the cap and the allowing it to cool.

Figure 2:
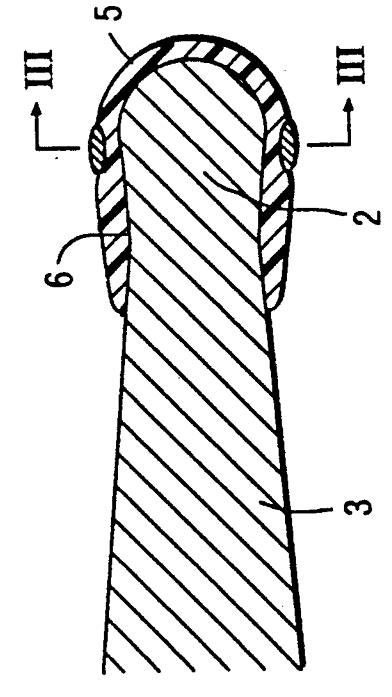
FIG. 2 is a side cross-sectional view of the tip and tapered shaft portions of the drumstick of FIG. 1.
Figure 3:
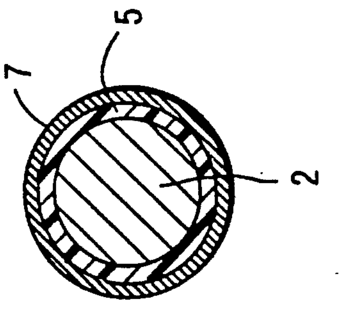
FIG. 3 is a front cross-sectional view of the tip of the drumstick shown in FIG. 1.
Figure 4:
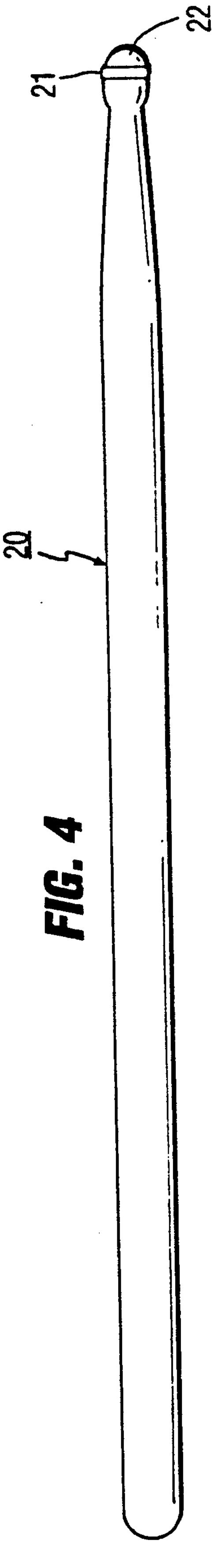
FIG. 4 is a side elevational view of another embodiment of the invention.

Referring to FIG. 4, there is shown a conventional type drumstick 20 similar to that described with reference to FIGS. 1-3 except that in this embodiment, the metallic ring 21 is affixed directly to the tip 22 of the drumstick 20 without the use of a plastic cap.

As previously stated, the novel feature of the invention described herein is also suitable for use and should also enhance the performance of drumsticks other than the conventional wooden drumstick. For example, the ring, or cap and ring can be applied to any of the prior art drumsticks described in the previously mentioned issued patents.

While the invention as described in terms of the preferred embodiment employs a plastic cap and a metal ring, it should be understood that the invention should not be limited by the use of such materials. For example, it is contemplated that one could form a cap over the tip of a drumstick out of materials other than plastics, including for example, rubber, ceramics, graphite and composites. Similarly, the hard, rigid impacting ring other hard, rigid material can be formed of materials other than metals, such as, graphite, ceramics, plastics and the like.

What I claim is:

1. A drumstick having a body comprising a shaft and a striking tip extending from one end of said shaft, said striking tip having a circumference and a hard, rigid, metallic percussion impact ring around said circumference wherein the impact ring rests within a groove provided around said circumference such that an outer surface of said impact ring is raised as compared with the surface of the striking tip adjacent said impact ring.

2. The drumstick recited in claim 1 wherein the ring is brass.

3. The drumstick recited in claim 2 wherein the body of the drumstick is solid wood and the shaft includes a tapered portion leading to the tip.

4. A drumstick having a body comprising a cylindrical shaft and a bulbous striking tip, said striking tip having a conformal plastic cap thereover, said cap provided with a hard, rigid, metallic percussion impact ring circumferentially therearound, said cap having a shallow groove around a circumference of said cap, and said impact ring being positioned within said groove, an outer surface of said impact ring being raised with respect to the surface of the cap.

5. The drumstick recited in claim 4 wherein the body of the drumstick is wood, the cap is plastic and the ring is metallic.

6. The drumstick recited in claim 4 wherein the cap is nylon and the ring is brass.

7. The drumstick recited in claim 4 wherein the ring is affixed to the cap and the cap is affixed to the tip such that neither the ring nor the cap are moveable.

8. A solid wooden drumstick comprising a cylindrical shaft having a tapered portion and a bulbous striking tip at an end of the tapered portion, the improvement comprising a plastic cap over and conforming to the striking tip and affixed to said tip, said cap having a circumferential shallow groove therein, and a metallic ring affixed within said groove such that an outer surface of the ring is higher than the surface of said cap such that on normal impact of the drumstick with a percussion instrument, the metallic ring is first to impact the instrument.

9. The drumstick recited in claim 8 wherein said cap is nylon and said ring is brass.

10. A drumstick having a body comprising a shaft terminating in a striking tip, said striking tip having a circumference and a metallic percussion impact ring around said circumference.

11. The drumstick recited in claim 10 wherein the ring is brass.

12. The drumstick recited in claim 11 wherein the body of the drumstick is solid wood and the shaft includes a tapered portion leading to the tip.

13. A drumstick having a body comprising a cylindrical shaft and a bulbous striking tip, said tip having a conformal cap thereover, said cap provided with a metallic percussion impact ring circumferentially therearound.

* * * * *